(12) United States Patent
Walters et al.

(10) Patent No.: US 8,908,365 B2
(45) Date of Patent: Dec. 9, 2014

(54) DISPLAY SYSTEM HAVING A CONTINUOUS FLEXIBLE DISPLAY WITH DISPLAY SUPPORTS

(75) Inventors: Michael Walters, Eindhoven (NL); Han Van Den Tillaar, Eindhoven (NL); Volker Barnhart Verschoor, Eindhoven (NL); Robert Sjang Josine Van Dijk, Eindhoven (NL); Pieter Van Lieshout, Eindhoven (NL)

(73) Assignee: Creator Technology B.V., Breda (NL)

( * ) Notice: Subject to any disclaimer, the term of this patent is extended or adjusted under 35 U.S.C. 154(b) by 262 days.

(21) Appl. No.: 13/532,633

(22) Filed: Jun. 25, 2012
(Under 37 CFR 1.47)

(65) Prior Publication Data

US 2013/0342094 A1 Dec. 26, 2013

(51) Int. Cl.
*G06F 1/16* (2006.01)
*G09F 19/00* (2006.01)
*H04M 1/02* (2006.01)

(52) U.S. Cl.
CPC .............. *G09F 19/00* (2013.01); *G06F 1/1615* (2013.01); *G06F 1/1652* (2013.01); *H04M 1/0216* (2013.01); *H04M 1/0247* (2013.01); *H04M 1/0268* (2013.01); *G06F 1/1641* (2013.01); *G06F 1/1681* (2013.01); *G09G 2380/02* (2013.01)
USPC ................ 361/679.27; 312/319.2; 248/181.3; 345/520

(58) Field of Classification Search
USPC ......... 312/223, 1, 223.2, 223.3, 319.2, 332.1, 312/330.1, 257.1, 172, 173, 236, 244, 216, 312/7.1, 7.2, 223.6; 455/556.1, 566, 179.1, 455/2.01, 575.1, 550.1, 90.3, 575.4; 248/221.11, 636, 224.8, 220.21, 309.1, 248/314, 220.22, 205.1, 276.1, 122.1, 558, 248/181.1, 310; 361/679.21, 679.22, 361/679.23, 679.24, 679.25, 679.26, 361/679.27, 679.31, 679.32, 679.33, 361/679.34, 679.35, 679.37, 679.38, 679.4, 361/679.43, 679.47, 679.56; 345/173, 174, 345/204, 690, 419, 168, 652, 520, 169, 236
See application file for complete search history.

(56) References Cited

U.S. PATENT DOCUMENTS

| | | | |
|---|---|---|---|
| 5,530,970 A * | 7/1996 | Knutson | ..................... 2/209.13 |
| 8,363,393 B2 * | 1/2013 | Bemelmans | ............. 361/679.21 |
| 8,616,510 B2 * | 12/2013 | Zarelius | ..................... 248/200.1 |
| 2003/0064688 A1 | 4/2003 | Mizuta et al. | |
| 2003/0119544 A1 | 6/2003 | Gventer | |
| 2011/0102976 A1 | 5/2011 | Chen | |
| 2011/0286157 A1 | 11/2011 | Ma | |

FOREIGN PATENT DOCUMENTS

EP 2403222 1/2012

OTHER PUBLICATIONS

European Patent Office, Search Report, Patent Application Serial No. 13169736.9-1858, Nov. 5, 2013, Germany.

* cited by examiner

*Primary Examiner* — Hung Duong

(57) ABSTRACT

A display system comprises a continuous flexible display and two main display supports being hingeably connected with respect to each other between a closed storage position and a planar open position for fixing the flexible display in an open position. Each of the supports is structurally configured to support respectively a first and a second portion of the flexible display, a segment of the flexible display is located between the said respective portions of the flexible display in the open position. The display system comprises a spring force biased mechanism operative in either the open or closed position or both the open and closed positions of the flexible display, biasing said segment of the flexible display in the respective position.

59 Claims, 9 Drawing Sheets

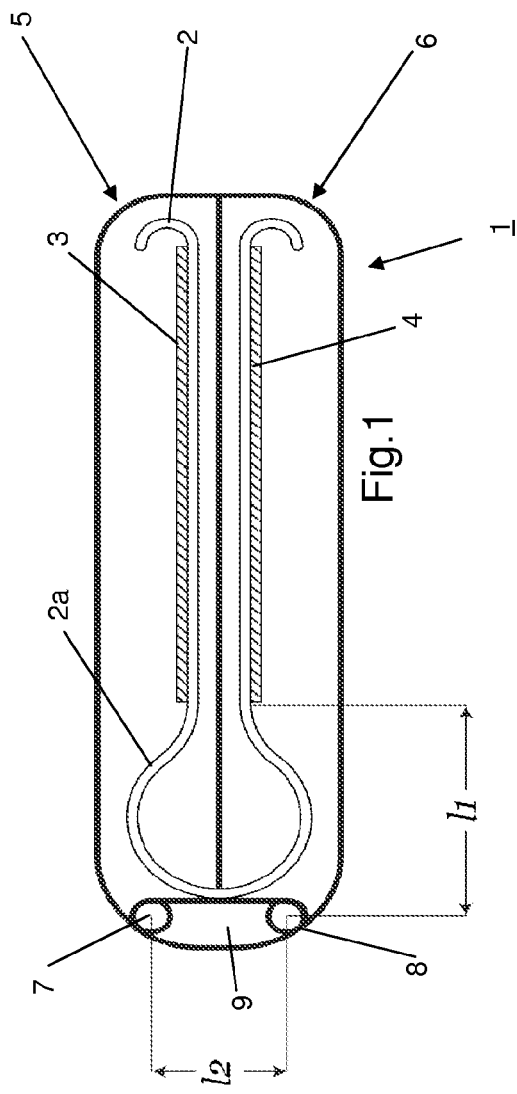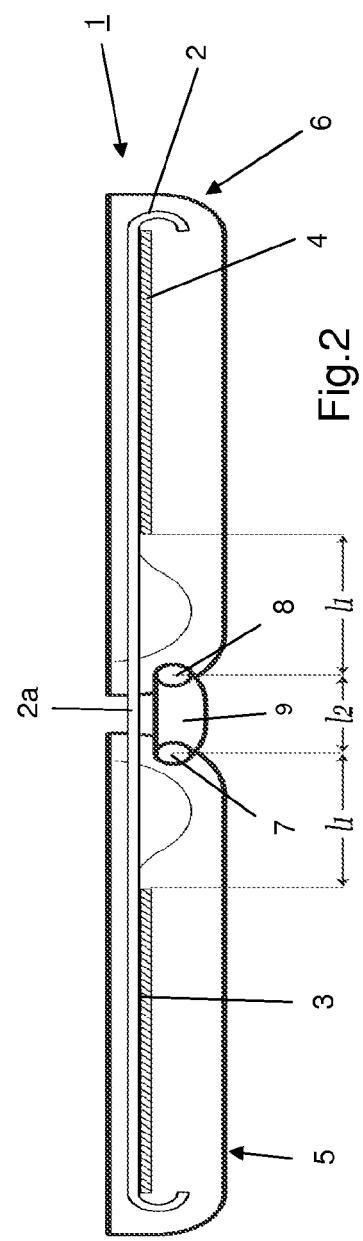

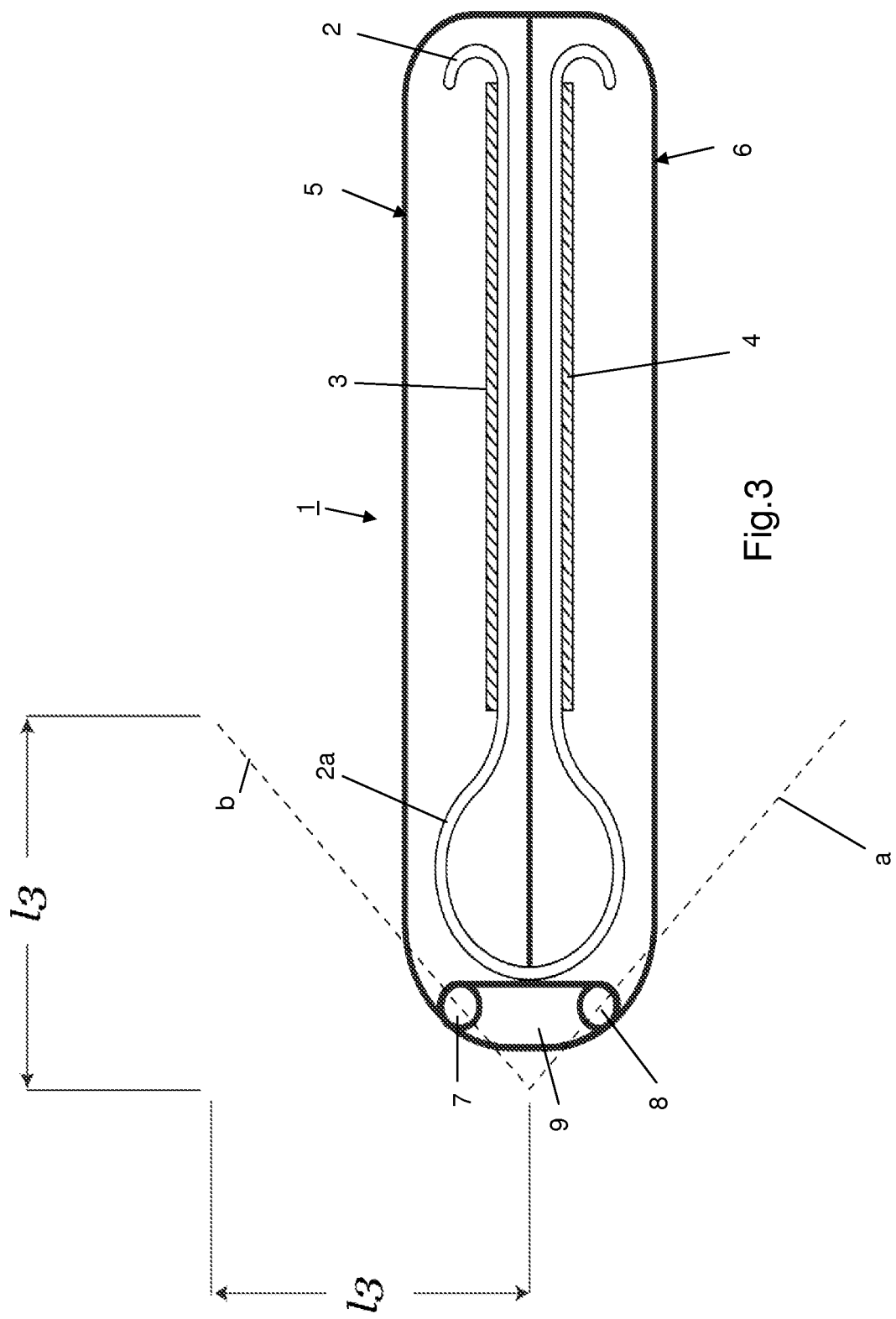

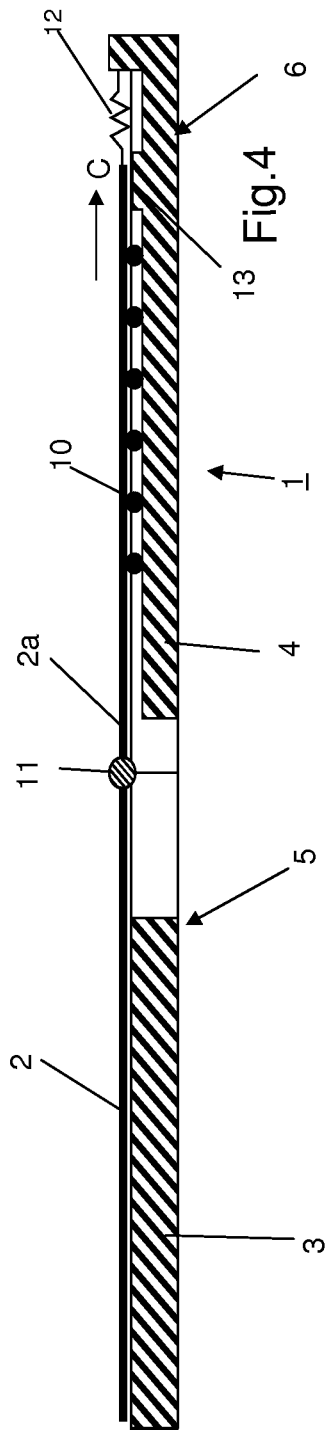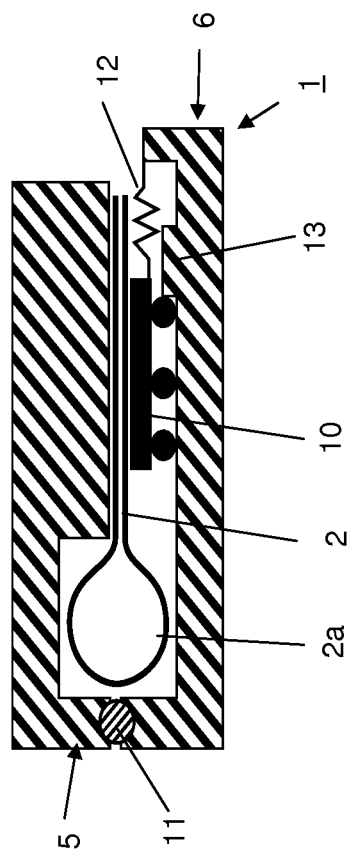

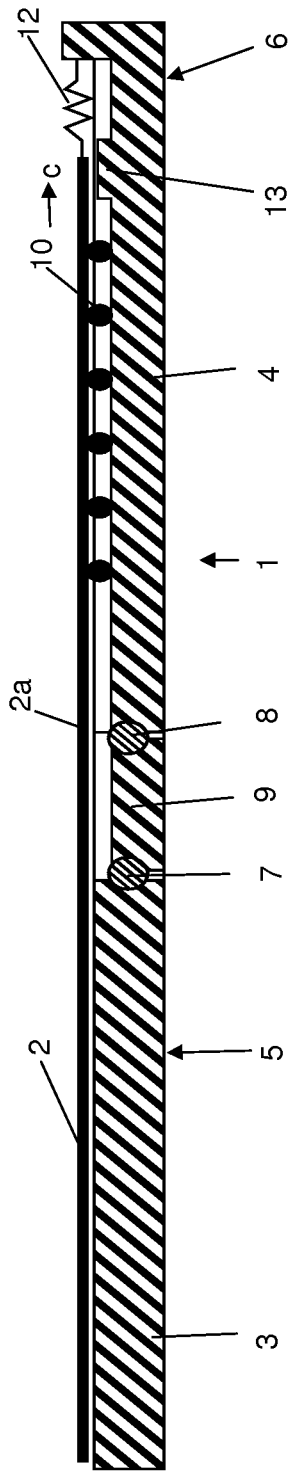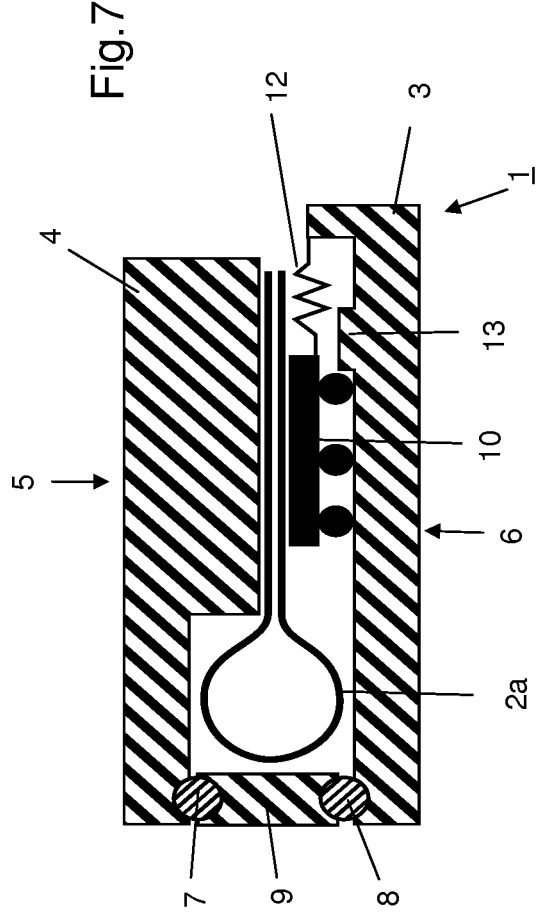

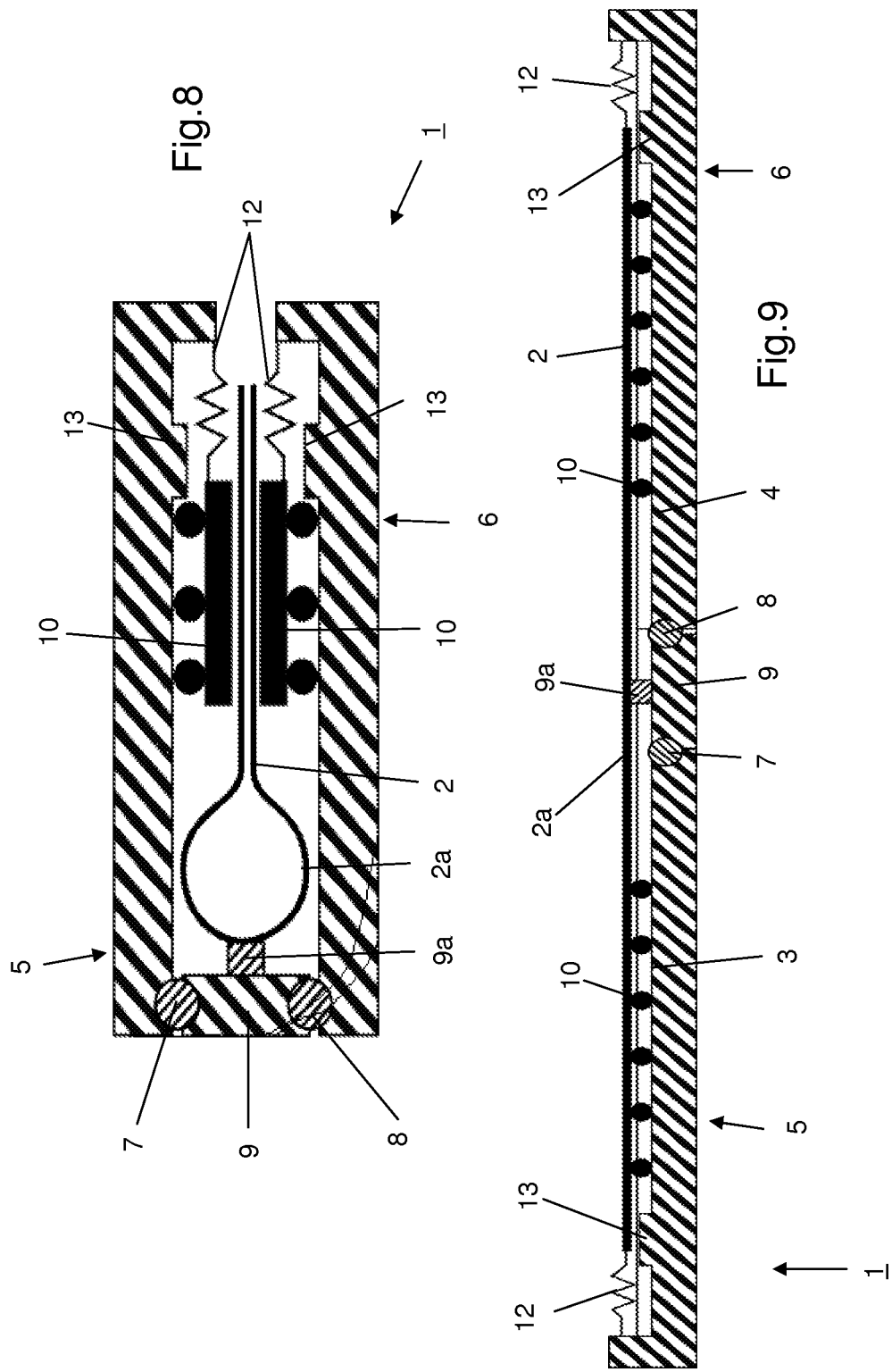

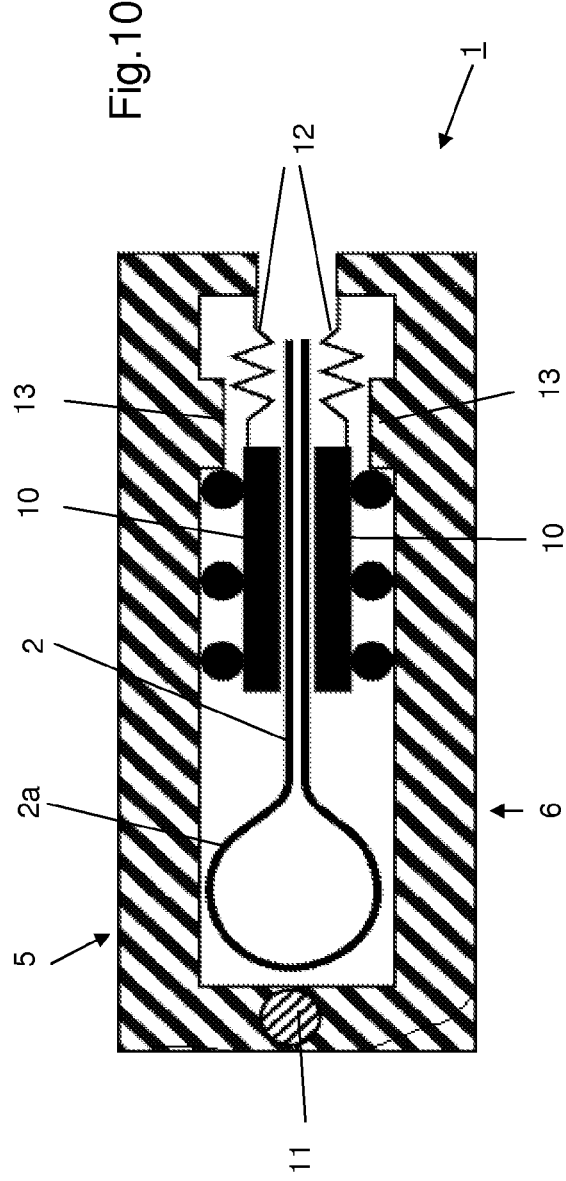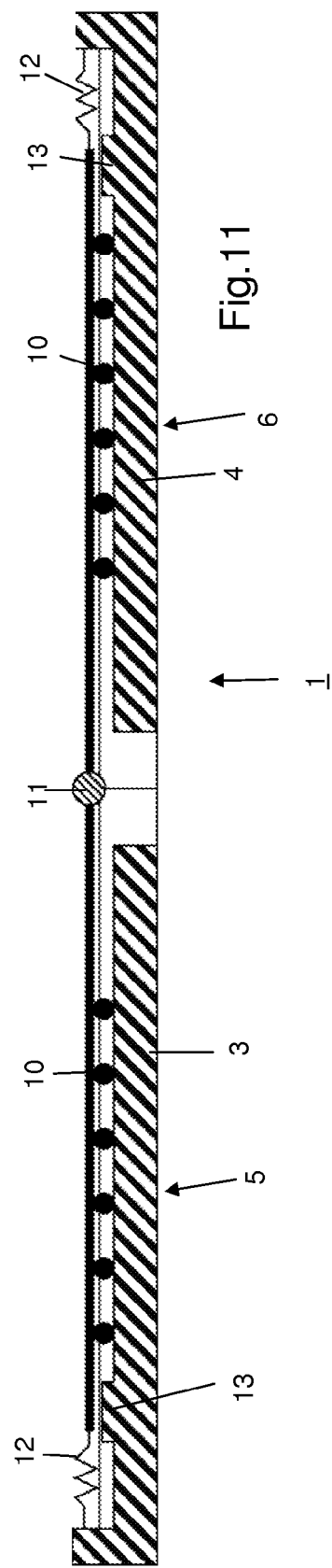

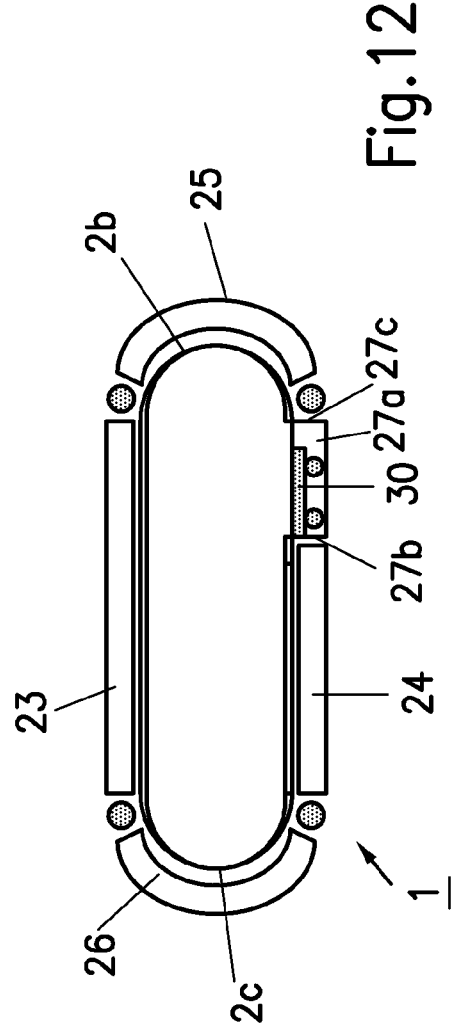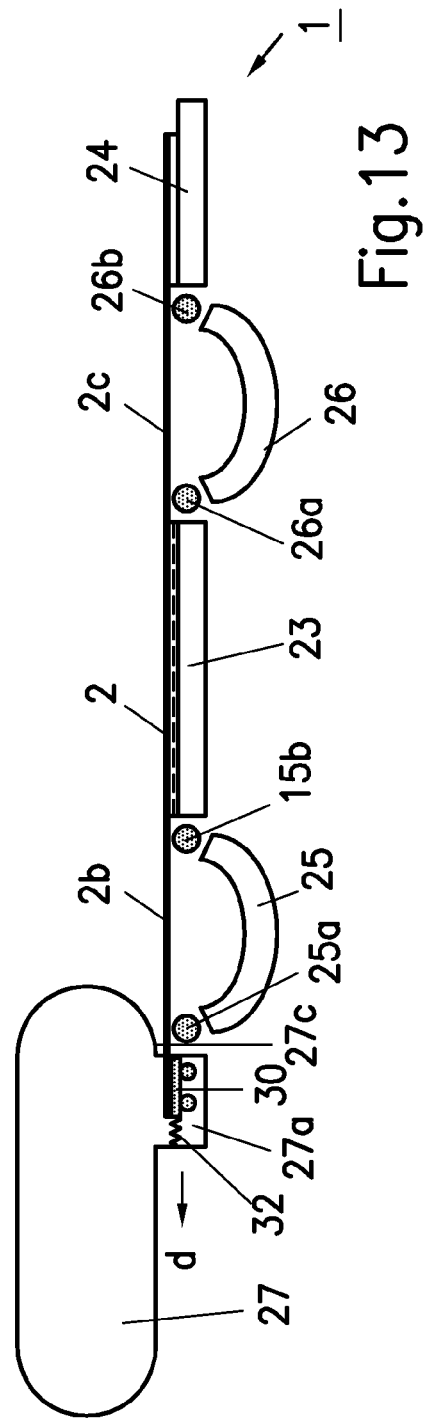

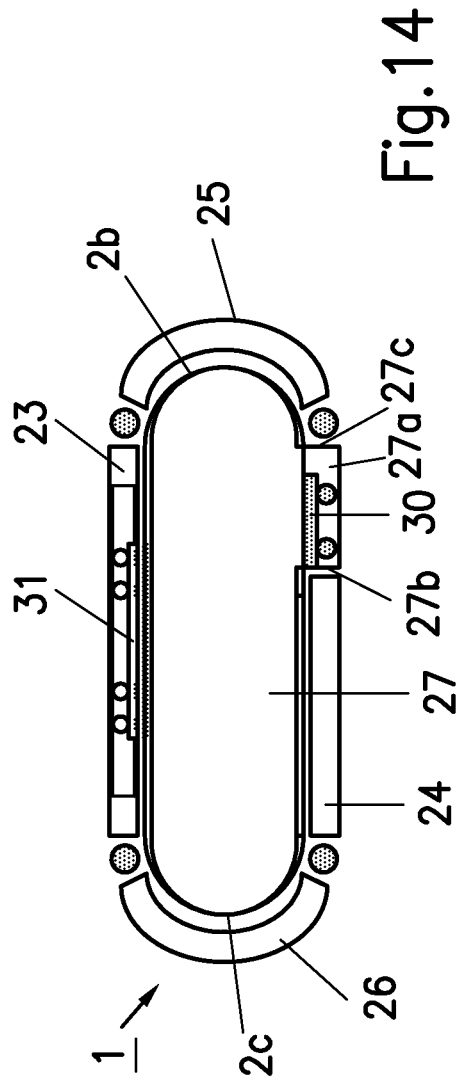
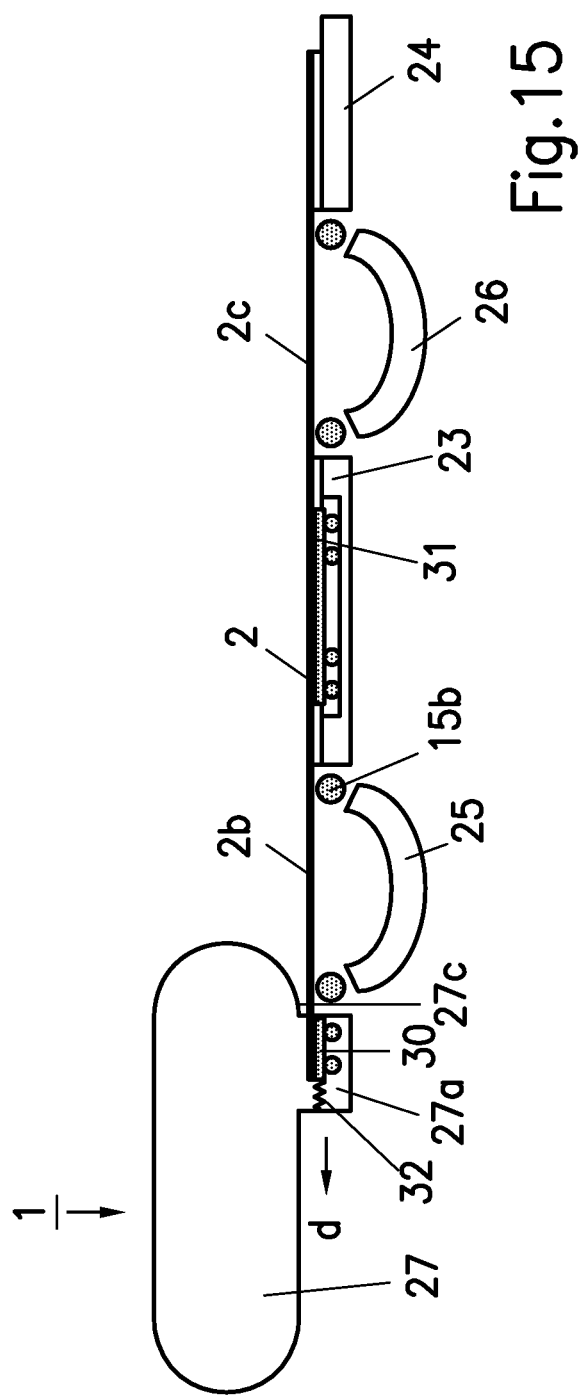

DISPLAY SYSTEM HAVING A CONTINUOUS FLEXIBLE DISPLAY WITH DISPLAY SUPPORTS

TECHNICAL FIELD

The present invention generally relates to flexible displays. The present invention specifically relates to continuous flexible displays provided with display supports.

DESCRIPTION OF RELATED ART

Flexible and especially rollable displays are manufactured on an organic substrate and are very thin. This makes it possible to repeatedly bend them with a small radius, a requirement for a rollable display. The advantages of a rollable display are the small volume needed for storing in the closed position and the lack of glass making the display unbreakable and of light weight.

A number of product concepts have been developed for flexible displays. The most important concepts are the 'book', the 'wrap' and the 'roll'.

The 'book' concept is the simplest implementation of a rollable display comprising two hingeably connected support halves with a continuous display. In the middle near the hinge mechanism is a hollow space to accommodate the curved segment of the display in the situation where the 'book' is in the closed position. The display size is at most twice the size of the closed display system. In practice, it will be around 1.8× the size due to the bezel of the support halves needed around the display.

The 'wrap' concept comprises a display, wrapped with its front side to the inside. Thus the display is protected when the 'wrap' is in the closed position. The display currently makes one complete turn around the device body when wrapped. Therefore, the size of the display will be about twice the size of the device. For larger displays compared to the device body more turns are required, which adds mechanical complexity.

In these 'book' or 'wrap' concepts with hinge constructions in the connection of the support halves, the display is fixed at either end at the support halves. The flexible display in such display systems may interfere in two ways with the hinge constructions (in either the open or closed position). First in a literal sense. In concepts where the hinge constructions are directly below or behind the display there may not be enough space to create a functional hinge. Secondly, normally the freedom of position (relative to the display) of the hinge pins is also limited, because their relative position to the display needs to be taken into account in open as well as closed position. While flexing, the curvature of the display should not exceed a certain value, as this will result in damage to the display. Often, this flexed shape takes quite a bit of room and the construction of the device and especially the position of the hinge pin(s) must provide enough space to allow the display to do this.

Basically, often there is not enough space for the hinge construction or the hinge(s) would need to be positioned in a way that would not be desirable from a product design point of view.

Since the backside of the display in the hinge area between the display supports is less suitable to be connected with stiff parts, at the unsupported parts of the display in this area the backside and the lateral sides become vulnerable to damage in the open position. This can result in special problems when touch functionality has to be integrated into the display.

It is an object of the invention to increase the design freedom for hinge constructions and their positioning in such a display system with a continuous flexible display.

SUMMARY

According to one aspect the invention provides a display system comprising a continuous flexible display, a support frame comprising first and second main display supports, coupled by a hinge mechanism with at least one hinge axis and each structurally configured to support respectively a first and a second portion of the flexible display, the two main display supports being hingeable between a configuration for fixing the flexible display in a closed storage position and a planar configuration for fixing the flexible display in an open position, a segment of the flexible display is located between the said respective portions of the flexible display in the open position, wherein the display system comprises a spring force biased mechanism operative in either the open or closed position or both the open and closed positions of the flexible display, biasing said segment of the flexible display in the respective position.

The advantages of the invention are that by the spring force biased mechanism a construction for a display system of this kind is created enabling that the flexible display has sufficient stiffness in the extended situation, but yet occupies only a small volume in the collapsed, closed situation. Standard available hinge solutions on the market can potentially be used for the display system in accordance with the invention instead of a dedicated proprietary construction. Due to the increased space available in the hinge area more space is available for additional display support mechanisms such has described in U.S. application No. 61/506,177, filed Jul. 11, 2011.

According to a preferred embodiment of the invention the first portion of the flexible display is fixed to the first main display support, whereas the second portion of the flexible display is slidably mounted on the second main display support, allowing at the location of the mounting during movement of the display between the storage and open position a sliding movement of the second portion of the flexible display with respect to the second main display support in a direction substantially perpendicular to the direction of the hinge axis, the spring force biased mechanism comprises spring means located in the coupling between the second portion of the flexible display and the second main display support, biasing said segment of the flexible display in the respective position. In this embodiment the second portion of the display is fixed onto the slidable mounting, which allows a sliding in one direction. In order to keep the display flat in the open position of the device, the mounting is connected via the spring means to the second main display support.

This solution, with a spring means, causes the display in the closed position to be moved away from the hinge(s) giving more room for the hinge construction at this point. Of course some extra space is needed elsewhere in the device (in closed position) to make this possible. Another advantage is that the display in open position of the device can be pre-stretched by the spring means, thus preventing sagging of the display in the hinge area in the open position. Because of this pre-stretching, the display will also be more able to withstand touching with less deformation. Due to the pre-stretching the user will have a more consistent feeling of touch across the whole display, also in the unsupported areas.

Preferably the spring force biased mechanism comprises a slider element, the second portion of the flexible display is fixed to the slider element, which is slidably mounted on the second main display support.

In another preferred embodiment of the invention the hinge mechanism comprises a flexible hinge, which is part of the spring force biased mechanism and enables a freedom of movement of the hinge pin in a direction substantially parallel to the display surface in the open position. In this embodiment the hinges are moving to have "flexible" hinge axis positions. Basically the hinge pins would be mounted in an elastic substance (such as rubber). By applying the display in such a way that in open device position it would be over-stretched the hinge pin or pins will shift to accommodate the required display length. This would also provide a spring like function which could keep the display taut in the unsupported areas, while preventing too high stress in the display due to "overstretching".

In another solution such a mechanism is applied to a 'wrap' type concept. According to another aspect of the invention the system comprises a continuous flexible display, a body, a support frame comprising first and second main display supports, coupled by a first hinge mechanism and each structurally configured to support respectively a first and a second portion of the flexible display, the first main display support is coupled by a second hinge mechanism with the body, the two main display supports being hingeable between a wrapped configuration around the body for fixing the flexible display in a closed storage position and a planar configuration for fixing the flexible display in an open position, a first segment of the flexible display is located near the first hinge mechanism between the said respective portions of the flexible display in the open position, a third portion of the flexible display being coupled with the body, a second segment of the flexible display is located near the second hinge mechanism between the first and third portion of the flexible display, wherein the third portion of the flexible display is slidably mounted on the body, wherein the display system comprises a spring force biased mechanism operative in either the open or closed position or both the open and closed positions of the flexible display, biasing said second segment of the flexible display in the respective position.

In this solution a slider could be applied in the device body. In this case freedom of movement would be provided for either the last hinge mechanism or for both mechanisms if the display is also slidably mounted to the first main display support.

These embodiments of the invention are applicable for different kinds of flexible displays, i.e. of 'wrap' or of 'book' type. The proposed solutions can be used for devices with hinge mechanisms comprising one hinge axis or more hinge axes.

BRIEF DESCRIPTION OF THE DRAWINGS

FIGS. 1 and 2 show schematic side views of a conventional 'book' type embodiment in a closed storage position (FIG. 1) and an open operational position (FIG. 2), respectively;

FIG. 3 shows a schematic side view of the 'book' embodiment of FIG. 1 with the possible positions of the hinge axes indicated by dotted lines;

FIGS. 4 and 5 show schematic side views of a 'book' embodiment in accordance with the invention in an operational position (FIG. 4) and a storage position (FIG. 5), respectively, in accordance with the invention;

FIGS. 6 and 7 show schematic side views of another 'book' embodiment in accordance with the invention in an operational position (FIG. 6) and a storage position (FIG. 7), respectively, in accordance with the invention;

FIGS. 8 and 9 show schematic side views of yet another 'book' embodiment in accordance with the invention in a storage position (FIG. 8) and an operational position (FIG. 9), respectively, in accordance with the invention;

FIGS. 10 and 11 show schematic side views of an alternative 'book' embodiment in accordance with the invention in a storage position (FIG. 10) and an operational position (FIG. 11), respectively, in accordance with the invention;

FIGS. 12 and 13 show schematic side views of a 'wrap' embodiment in accordance with the invention in a storage position (FIG. 12) and an operational position (FIG. 13), respectively, in accordance with the invention;

FIGS. 14 and 15 show schematic side views of another 'wrap' embodiment in accordance with the invention in a storage position (FIG. 14) and an operational position (FIG. 15), respectively, in accordance with the invention;

DESCRIPTION OF THE EMBODIMENTS

Figure 16:
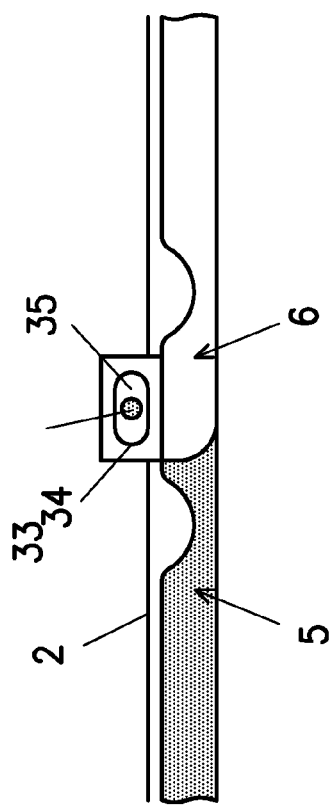
FIGS. 16, 17 and 18 show schematic side views of another 'book' embodiment in accordance with the invention in an operational position (FIGS. 16, 18) and a storage position (FIG. 17).

Two product concepts developed for flexible displays are the 'book', the 'wrap' and the 'roll'. A 'wrap' concept is shown in WO 2008/054206 A2, a 'book' in non-prepublished U.S. application No. 61/506,177 of PolymerVision B.V., filed Jul. 11, 2011 (both herewith incorporated by reference).

The display system 1 schematically shown in FIGS. 1, 2 and 3 is a 'book' type embodiment as disclosed in the non-prepublished U.S. application No. 61/506,177, filed Jul. 11, 2011. This display system comprises a flexible display 2 and display support means comprising two main display supports 3, 4, located in book housing halves 5, 6 respectively. The display is fixed at fixation points at the display supports 3, 4. Between the fixation points the display has a central segment $2a$. The book halves 5, 6 with their supports 3, 4 are connected via two hinges 7, 8 which are part of a hinge mechanism 9 and are each structurally configured to support a respective portion of the flexible display 2. In order to have a flat display 2, in the open position shown in FIG. 2 the length of the unfixed central display segment $2a$ needs to match the distance between the fixation points of the display. Since in the storage position of the flexible display 2 shown in FIGS. 1 and 3 the mutual distance of these fixations points of the display at the respective supports 3, 4 is much smaller compared with the open position, the central display segment $2a$ needs to flex to compensate for this reduction of distance.

Moreover, while flexing, the curvature of the display 2 should not exceed a certain value, as this will result in damage to the display. This flexed shape may take much room inside the housing halves 5, 6 and the construction of these housing halves with the display supports 3, 4 must provide enough space to allow the display segment $2a$ to be (partially) curved. The display should not interfere with the hinges 7, 8 both in open and closed storage position, but also in any intermediate state, while moving between these positions. In practice, due to the position of the hinges 7, 8 in relation to the flexed display, also in combination with the required material thicknesses and with the required minimum radius of curvature, this results in a either a very limited freedom of the position of the hinges and/or almost no space for designing strong enough hinges.

The limitation in the positioning of the hinges 7, 8 inside the housing halves 5, 6 is explained by the following. In this double hinge 'book' type embodiment the distance between the fixation points of the display is determined by twice the horizontal distance (11) to the hinge points of hinges 7, 8 from the fixation point of the display at the main display supports 3, 4, plus the distance between the hinge points (12), e.g.:

$$\text{unfixed display length} = 2*11+12$$

Reducing the distance between the hinge points (12) to zero would result in a single hinge 'book' type of the display system. However the calculation of the unfixed display length would still hold.

In the other extreme situation one could (theoretically) align the hinge points with the fixation points—in other words reduce the distance to the hinge points (11) to zero.

Due to the linear relationship between these extremes situations the upshot of these considerations is that the hinge points need to lie on the dotted lines a, b indicated in FIG. 3. Put in another way, freedom in choosing their position is limited:

$$13=(2*11+12)/2$$

In accordance with the invention, by allowing one of the fixed parts of the display to slide, the position of the hinge points can be shifted.

In a first embodiment of the invention schematically shown in FIGS. 4 and 5 the display system 1 has display supports 3, 4 inside housing halves 5, 6 which are hingeably connected by a hinge 11. The display 2 is connected at a first display portion with the display support 3 in the housing halve 5 and the display 2 is fixed at a second portion onto a slider element 10 which is slidably mounted on the display support 4. During movement from the open (FIG. 4) to closed position (FIG. 5) this element 10 allows a sliding movement on the display support in the housing halve together with the fixed display part in the direction of arrow c, i.e. in a direction substantially perpendicular to the direction of the axis of the hinge 11. During this movement of the housing halves 5, 6, the display segment 2a is moved away from the hinge 11, giving more room for the hinge mechanism inside the display housing at the location of the hinge 11 compared with the display system of FIGS. 1-3. In order to keep the display segment 2a flat after the housing halves have been moved to the open position, the display system comprises a spring force biased mechanism comprising spring means formed by a spring 12 connected with the slider element 10 and the housing halve 6, said spring biases said segment 2a of the flexible display in the direction of arrow c, i.e. away from the hinge 11. Due to the location of the axis of the hinge 11 with respect to the display 2, during movement to the open position the display becomes "overstretched" and thus the location of the hinge in combination with the working of the spring 12 ensure a stable open position of the display.

As shown in FIG. 5 when moving to the closed position the outward movement of the slider element 10 by the spring 12 in the direction c is limited by a stop formed by an abutment 13 on the housing halve 6.

In FIGS. 6 and 7 an embodiment is schematically shown with a slider element 10, a spring 12 and an abutment 13 which correspond with the preceding embodiment, but in this embodiment the housing halves 5, 6 are coupled by a hinge mechanism 9 provided with two hinges 7, 8. Compared with the display system of FIGS. 1-3 due to the slider element 10 also this double hinge embodiment shows in the closed position of FIG. 7 more room for the hinge mechanism 9 inside the display housing at the location of the hinges 7 and 8. After movement to the flat open position the housing halves 5, 6 are stably positioned with respect to each other in a way not shown, for example by a locking mechanism, a bi-stable spring mechanism and/or magnetic means.

In another embodiment of a 'book' concept shown in FIGS. 8 and 9, the segment 2a of the flexible display 2 is coupled with the support frame by a fixation 9a at the hinge mechanism 9 substantially in the middle between the first and the second portion of the flexible display. Each of the portions of the flexible display is fixed on a slider element 10 slidably mounted on the main display support 3, 4 respectively, allowing at the location of each mounting during movement of the display between the closed storage and open position a sliding movement of the respective portion of the flexible display with respect to the main display support in a direction substantially perpendicular to the direction of the hinge axes of the hinges 8, 9. At both sides of the display a spring 12 is located in the coupling between the respective portion of the flexible display and the main display support, biasing said segment of the flexible display in the respective position away from the hinges 7, 8. Stops 13 are located at both display supports 3, 4, limiting the outward movement of respective slider element 10. This embodiment with springs at both sides of the display 2 has the advantage of a profitable distribution of forces over the display during closing and opening, whereas in the planar open position both springs keep the display segment 2a flat. Due to the springs 12 and the support of the fixation 9a in the middle of the segment 2a, the segment 2a may withstand touching with less deformation. Due to the chosen dimensions and position of the fixation 9a to the hinge mechanism 9, in the closed position the shape of curvature of the segment 2a is positively influenced by the fixation 9a.

It is observed that this embodiment with the two slider elements 10 can also be configured without the fixation 9a of the segment 2a so that the display is only connected with the slider elements 10. Such a configuration has the advantage of an easy mounting of the display in the housing, whereas in the display itself a smooth transition exists between the parts supported by the slider elements and the non-supported parts of the segment 2a.

Also the embodiment shown in FIGS. 10 and 11, an alternative of the embodiment of FIGS. 8, 9 with a single hinge 11, comprises two sliders 10, two springs 12 and two stops 13. In this embodiment the segment 2a of the flexible display 2 is not coupled the support frame. The only coupling of the display 2 with the support frame is via the sliders 10 and the springs 12. In the open position of FIG. 11 the springs 12 keep the display in a position, substantially symmetric with respect to the hinge 11. After being moved into the closed position the sliders 10 are biased by the springs 12 against the respective stop 13 enabling the segment 2a to be positioned in a well defined curvature, free from parts of the housing. Another advantage is the possibility to use identically shaped housing halves for assembling the display system 1. Further advantage is that the spring force of the springs 12 can be limited to a comparatively low level.

An embodiment of the display system 1 schematically shown in FIGS. 12 and 13 is a 'wrap' embodiment as disclosed in WO 2008/054206 A2. It comprises a flexible display 2 and a display cover having two main display supports 23, 24. The first support 23 is connected via a hinge mechanism 25 provided with double hinges 25a,b to a body 27, the second cover 24 is connected via a hinge mechanism 26 provided with double hinges 26a,b to the cover 25. The supports 23 and 24 are each structurally configured to support a first respectively a second portion of the flexible display 2, whereas a first segment 2b of the display is located near the hinge mechanism 25 between the first and a third portion of the display and a second segment 2c near the hinge mechanism 26 between the first and second portion of the display. Due to the hinge mechanisms 25, 26 the two main display supports 23, 24 can be wrapped and unwrapped between a configuration shown in FIG. 12 for fixing the flexible display in a closed storage position and a planar configuration shown in FIG. 13 for fixing the flexible display in an open position. Also in this 'wrap' type embodiment a slider mechanism is applied, formed by a slider element 30 located in a bottom part 27a of the device body 27 and movable on this bottom part 27a between two end stops formed by abutments 27b and 27c. A portion of the display 2 is fixed at the slider element 30.

In this case freedom of movement would be provided for the hinge mechanism 25 or for both hinge mechanisms 25, 26, if the display is not glued to the display support 23. In the storage position of the flexible display 2 at the location of the hinge mechanisms 25, 26 between the main display supports 23, 24 there is sufficient free space for enabling a partial curvature of the display segments 2b, 2c without conflicting with the respective main display supports.

In FIGS. 14 and 15 another 'wrap' type embodiment is shown comprising two slider elements, one slider element 30 in the bottom part 27a of the device body 27 and one slider element 31 on the display support 23 of the cover. In this embodiment the spring force biased mechanism comprises a sliding mounting of two sliding elements 30, 31 both connected with a respective portion of the flexible display and both biased by the spring 32 in the direction of arrow d.

A spring 32 biases in the embodiment of FIGS. 12, 13 the slider element 30 and in the embodiment of FIGS. 14, 15 the two slider elements 30, 31 with the attached part of the display 2 in the direction of arrow d. In these 'wrap' concepts in the closed position due to the spring 32 the display will be "stretched" around the main body. Thus the curved segments 2b, 2c are positioned at a distance from the hinge mechanisms providing design freedom for the construction of the hinge mechanisms. Preferably, when moving to the closed position the movement of the slider element 30 by the spring 32 in the direction d is limited by the abutment 27b on the bottom part 27a of the body 27. Due to the spring force biased mechanism comprising the slider element in the open planar position sagging of the display at the location of the hinge mechanisms 25, 26 is prevented. Due to this "stretching" in this position at the segments 2b, 2c the display 2 will feel stiff which gives a good quality perception of the display system and at these segments the display becomes more able to withstand touching with less deformation.

Figure 17:
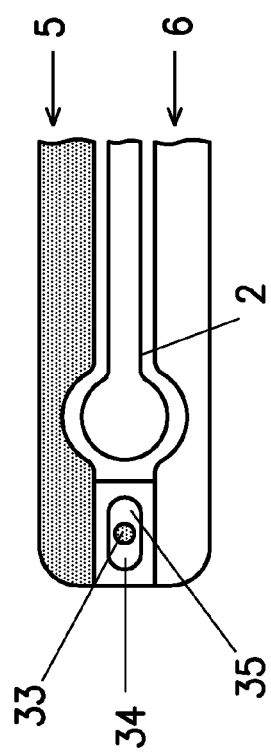
Figure 18:
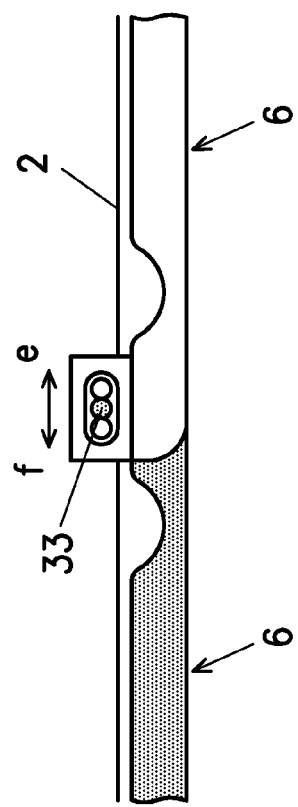

In FIGS. 16-18 is shown a part of another 'book' type embodiment with a hinge pin 33 in the connection between the housing halves 5 and 6. In this embodiment the hinge pin 33 is part of a flexible hinge which has "flexible" hinge axis positions inside a hinge mechanism 34 and which is part of a spring force biased mechanism and enables a freedom of movement of the hinge pin in opposite directions e, f substantially parallel to the display surface in the open position.

In this embodiment the hinge pin is mounted in an elastic substance 35 (such as rubber). While moving from the closed position of FIG. 17 to the open position of FIG. 16 the display 2 becomes over-stretched and as shown in FIG. 18 the hinge pin will shift in the direction e and thereafter in opposite direction f between spring force biased positions to accommodate the required display length. This would also automatically provide a spring like function which would keep the display taut in the unsupported areas between the main display supports. In an alternative embodiment (not shown) instead of one hinge pin 33 a double hinge construction is applied of the type as shown in FIGS. 6, 7 in which both hinges are provided with a hinge pin mounted in an elastic substance 35. In addition it is observed that instead of a rigid hinge pin rotatable in an elastic substance the pin may be made from an elastic material and the pin rotates in rigid substance.

It is observed that in an alternative solution (not shown) for the embodiments of FIGS. 4-18 one of the portions of the flexible display 2 comprises an elastic border part, being connected with the respective main display support, biasing the flexible display in the open position. This elastic border part may be an alterative for the spring 12 or 32 in the respective embodiments, but may also be applied in these embodiments in combination with the spring 12 or 32 or in the embodiment of FIGS. 16-18 in combination with the "flexible" hinge axis position.

The display system in accordance with the invention provides a way to assemble a flexible display in a housing, leaving one degree of freedom for movement of the display in the housing. Basically the invention allows one (or more) of the 'fixation' point(s) of the display to move relative to the hinge while closing the housing. Essentially this reduces during closing the excess display length that needs to be compensated for.

An advantage of the invention is that the design freedom for the display system is much larger and not limited by the prior limited position of the hinge axis (or axes in case of double hinges).

A second advantage is that the display in open situation of the system can be pre-stretched by the spring (or spring means) 12 or 32, located in the connection between the slider element and the housing, thus preventing the sagging of the display segment 2a, 2b, 2c respectively in the hinge area in the open situation. Because of this pre-stretching, the display will also be more able to withstand touching with less deformation.

In accordance with the invention the spring force biased mechanism—i.e. the slider or sliders 10 cooperating with the spring or springs 12 of FIGS. 4-11, the slider 30 or sliders 30, 31 and the spring 32 of FIGS. 12-15 and the flexible hinge 33 of FIGS. 16-18—is operative in either the open or closed position or both the open and closed positions of the flexible display, biasing the segment 2a, respective 2b, 2c of the flexible display in the respective position. Although in most cases the movement of the slider is limited by the end stop 13 during movement of the display from the open to the storage position the movement, alternatively this limitation occurs during movement of the display from the storage to the open position.

Finally due to the increased space available in the hinge area more space is available for a "touch support" mechanism such as described in U.S. application No. 61/506,177, filed Jul. 11, 2011. Such a "touch support" for the display segment 2a in combination with the pre-stretching of the display by the spring 12 may be advantageous for the life time of the display, especially in the gaps between the different display supports of the display system, where no support is available.

The detailed drawings, specific examples and particular formulations given, serve the purpose of illustration only. Furthermore, other substitutions, modifications, changes, and omissions may be made in the design, operating conditions, and arrangement of the exemplary embodiments without departing from the scope of the invention as expressed in the appended claims.

The invention claimed is:

1. A display system comprising:
a continuous flexible display;
a support frame comprising first and second main display supports, coupled by a hinge mechanism with at least one hinge axis and each structurally configured to support respectively a first and a second portion of the flexible display, the two main display supports being hingeable between a configuration for fixing the flexible display in a closed storage position and a planar configuration for fixing the flexible display in an open position, a segment of the flexible display being located between the said respective portions of the flexible display in the open position; and
a spring force biased mechanism operative in either the open or closed position or both the open and closed positions of the flexible display, biasing said segment of the flexible display in the respective position, wherein the spring force biased mechanism comprises a slider element, the second portion of the flexible display is fixed to the slider element, which is slidably mounted on the second main display support, wherein during movement of the display from the open to the storage position the movement of the slider element is limited by a first end stop.

2. The display system as recited in claim 1, wherein the first portion of the flexible display is fixed to the first main display support, whereas the second portion of the flexible display is slidably mounted on the second main display support, allowing at the location of the mounting during movement of the display between the storage and open position a sliding movement of the second portion of the flexible display with respect to the second main display support in a direction substantially perpendicular to the direction of the hinge axis, the spring force biased mechanism comprising spring means located in the coupling between the second portion of the flexible display and the second main display support, biasing said segment of the flexible display in the respective position.

3. The display system as recited in claim 2, wherein the spring means comprise at least one spring biasing in the respective position of the display the slider element away from the hinge axis.

4. The display system as recited in claim 1, wherein during movement of the display from the storage to the open position the movement of the slider element is limited by a second end stop.

5. The display system as recited in claim 4, wherein the spring force biases the slider element against the second end stop.

6. The display system as recited in claim 1, wherein the spring force biases the slider element against the first end stop.

7. The display system as recited in claim 1, wherein each of said portions is slidably mounted on the respective main display support, allowing at the location of each mounting during movement of the display between the storage and open position a sliding movement of the respective portion of the flexible display with respect to the main display support in a direction substantially perpendicular to the direction of the hinge axis, the spring force biased mechanism comprising spring means located in each coupling between the respective portion of the flexible display and the main display support, biasing said segment of the flexible display in the respective position.

8. The display system as recited in claim 7, wherein the segment of the flexible display is fixed to the support frame substantially in the middle between the first and the second portion of the flexible display.

9. The display system as recited in claim 1, wherein one of the portions of the flexible display comprises an elastic border part, being connected with the main display support, biasing the flexible display in the open position.

10. The display system as recited in claim 1, wherein the hinge mechanism comprises a flexible hinge, which is part of the spring force biased mechanism and enables a freedom of movement of the hinge pin in a direction substantially parallel to the display surface in the open position.

11. The display system as recited in claim 10, wherein movement of the display supports from the closed to planar configuration enables movement of the hinge pin to a spring force biased position.

12. The display system as recited in claim 1, wherein the system further comprises:

a body, the first main display support being hingeably connected with the body, the two main display supports being hingeable between a wrapped configuration around the body for fixing the flexible display in a closed storage position and a planar configuration for fixing the flexible display in an open position, a third portion of the flexible display being coupled with the body, a second segment of the flexible display being located between the first and third portion of the flexible display, wherein the third portion of the flexible display is slidably mounted on the body, and wherein the display system comprises a spring force biased mechanism operative in either the open or closed position or both the open and closed positions of the flexible display, biasing said second segment of the flexible display in the open position.

13. The display system as recited in claim 1, wherein the spring force biased mechanism enables that the segment of the flexible display in the closed position is positioned with its curved end part at a distance from the hinge mechanism.

14. The display system as recited in claim 1, wherein the spring force biased mechanism enables that the segment of the flexible display in the open position is stretched, keeping the display taut in the area of the hinge mechanism.

15. A display system comprising:
a continuous flexible display;
a body;
a support frame comprising first and second main display supports, coupled by a first hinge mechanism and each structurally configured to support respectively a first and a second portion of the flexible display, the first main display support being coupled by a second hinge mechanism with the body, the two main display supports being hingeable between a wrapped configuration around the body for fixing the flexible display in a closed storage position and a planar configuration for fixing the flexible display in an open position, a first segment of the flexible display being located near the first hinge mechanism between the said respective portions of the flexible display in the open position, a third portion of the flexible display being coupled with the body, a second segment of the flexible display being located near the second hinge mechanism between the first and third portion of the flexible display; and
a spring force biased mechanism;
wherein the third portion of the flexible display is slidably mounted on the body, and wherein the spring force biased mechanism is operative in either the open or closed position or both the open and closed positions of the flexible display, biasing said second segment of the flexible display in the respective position.

16. The display system as recited in claim 15, wherein the spring force biased mechanism comprises a sliding mounting of both the first and the third portion of the flexible display.

17. A display system comprising:
a continuous flexible display;
a support frame comprising first and second main display supports, coupled by a hinge mechanism with at least one hinge axis and each structurally configured to support respectively a first and a second portion of the flexible display, the two main display supports being hingeable between a configuration for fixing the flexible display in a closed storage position and a planar configuration for fixing the flexible display in an open position, a segment of the flexible display being located between the said respective portions of the flexible display in the open position; and a spring force biased mechanism operative in either the open or closed position or both the open and closed positions of the flexible display, biasing said segment of the flexible display in the respective position, wherein the spring force biased mechanism comprises a slider element, the second portion of the flexible display is fixed to the slider element, which is slidably mounted on the second main display support, wherein during movement of the display from the storage to the open position the movement of the slider element is limited by an end stop.

18. The display system as recited in claim 17, wherein the first portion of the flexible display is fixed to the first main display support, whereas the second portion of the flexible display is slidably mounted on the second main display support, allowing at the location of the mounting during movement of the display between the storage and open position a sliding movement of the second portion of the flexible display with respect to the second main display support in a direction substantially perpendicular to the direction of the hinge axis, the spring force biased mechanism comprising spring means located in the coupling between the second portion of the flexible display and the second main display support, biasing said segment of the flexible display in the respective position.

19. The display system as recited in claim 18, wherein the spring means comprise at least one spring biasing in the respective position of the display the slider element away from the hinge axis.

20. The display system as recited in claim 17, wherein the spring force biases the slider element against the end stop.

21. The display system as recited in claim 17, wherein each of said portions is slidably mounted on the respective main display support, allowing at the location of each mounting during movement of the display between the storage and open position a sliding movement of the respective portion of the flexible display with respect to the main display support in a direction substantially perpendicular to the direction of the hinge axis, the spring force biased mechanism comprising spring means located in each coupling between the respective portion of the flexible display and the main display support, biasing said segment of the flexible display in the respective position.

22. The display system as recited in claim 21, wherein the segment of the flexible display is fixed to the support frame substantially in the middle between the first and the second portion of the flexible display.

23. The display system as recited in claim 17, wherein one of the portions of the flexible display comprises an elastic border part, being connected with the main display support, biasing the flexible display in the open position.

24. The display system as recited in claim 17, wherein the hinge mechanism comprises a flexible hinge, which is part of the spring force biased mechanism and enables a freedom of movement of the hinge pin in a direction substantially parallel to the display surface in the open position.

25. The display system as recited in claim 24, wherein movement of the display supports from the closed to planar configuration enables movement of the hinge pin to a spring force biased position.

26. The display system as recited in claim 17, wherein the system further comprises:

a body, the first main display support being hingeably connected with the body, the two main display supports being hingeable between a wrapped configuration around the body for fixing the flexible display in a closed storage position and a planar configuration for fixing the flexible display in an open position, a third portion of the flexible display being coupled with the body, a second segment of the flexible display being located between the first and third portion of the flexible display, wherein the third portion of the flexible display is slidably mounted on the body, and wherein the display system comprises a spring force biased mechanism operative in either the open or closed position or both the open and closed positions of the flexible display, biasing said second segment of the flexible display in the open position.

27. The display system as recited in claim 17, wherein the spring force biased mechanism enables that the segment of the flexible display in the closed position is positioned with its curved end part at a distance from the hinge mechanism.

28. The display system as recited in claim 17, wherein the spring force biased mechanism enables that the segment of the flexible display in the open position is stretched, keeping the display taut in the area of the hinge mechanism.

29. A display system comprising:

a continuous flexible display;

a support frame comprising first and second main display supports, coupled by a hinge mechanism with at least one hinge axis and each structurally configured to support respectively a first and a second portion of the flexible display, the two main display supports being hingeable between a configuration for fixing the flexible display in a closed storage position and a planar configuration for fixing the flexible display in an open position, a segment of the flexible display being located between the said respective portions of the flexible display in the open position; and a spring force biased mechanism operative in either the open or closed position or both the open and closed positions of the flexible display, biasing said segment of the flexible display in the respective position, wherein one of the portions of the flexible display comprises an elastic border part, being connected with the main display support, biasing the flexible display in the open position.

30. The display system as recited in claim 29, wherein the first portion of the flexible display is fixed to the first main display support, whereas the second portion of the flexible display is slidably mounted on the second main display support, allowing at the location of the mounting during movement of the display between the storage and open position a sliding movement of the second portion of the flexible display with respect to the second main display support in a direction substantially perpendicular to the direction of the hinge axis, the spring force biased mechanism comprising spring means located in the coupling between the second portion of the flexible display and the second main display support, biasing said segment of the flexible display in the respective position.

31. The display system as recited in claim 30, wherein the spring means comprise at least one spring biasing in the respective position of the display the slider element away from the hinge axis.

32. The display system as recited in claim 29, wherein each of said portions is slidably mounted on the respective main display support, allowing at the location of each mounting during movement of the display between the storage and open position a sliding movement of the respective portion of the flexible display with respect to the main display support in a direction substantially perpendicular to the direction of the hinge axis, the spring force biased mechanism comprising spring means located in each coupling between the respective portion of the flexible display and the main display support, biasing said segment of the flexible display in the respective position.

33. The display system as recited in claim 32, wherein the segment of the flexible display is fixed to the support frame substantially in the middle between the first and the second portion of the flexible display.

34. The display system as recited in claim 29, wherein the hinge mechanism comprises a flexible hinge, which is part of the spring force biased mechanism and enables a freedom of movement of the hinge pin in a direction substantially parallel to the display surface in the open position.

35. The display system as recited in claim 34, wherein movement of the display supports from the closed to planar configuration enables movement of the hinge pin to a spring force biased position.

36. The display system as recited in claim 29, wherein the system further comprises:
  a body, the first main display support being hingeably connected with the body, the two main display supports being hingeable between a wrapped configuration around the body for fixing the flexible display in a closed storage position and a planar configuration for fixing the flexible display in an open position, a third portion of the flexible display being coupled with the body, a second segment of the flexible display being located between the first and third portion of the flexible display,
  wherein the third portion of the flexible display is slidably mounted on the body, and
  wherein the display system comprises a spring force biased mechanism operative in either the open or closed position or both the open and closed positions of the flexible display, biasing said second segment of the flexible display in the open position.

37. The display system as recited in claim 29, wherein the spring force biased mechanism enables that the segment of the flexible display in the closed position is positioned with its curved end part at a distance from the hinge mechanism.

38. The display system as recited in claim 29, wherein the spring force biased mechanism enables that the segment of the flexible display in the open position is stretched, keeping the display taut in the area of the hinge mechanism.

39. A display system comprising:
  a continuous flexible display;
  a support frame comprising first and second main display supports, coupled by a hinge mechanism with at least one hinge axis and each structurally configured to support respectively a first and a second portion of the flexible display, the two main display supports being hingeable between a configuration for fixing the flexible display in a closed storage position and a planar configuration for fixing the flexible display in an open position, a segment of the flexible display being located between the said respective portions of the flexible display in the open position; and
  a spring force biased mechanism operative in either the open or closed position or both the open and closed positions of the flexible display, biasing said segment of the flexible display in the respective position,
  wherein the hinge mechanism comprises a flexible hinge, which is part of the spring force biased mechanism and enables a freedom of movement of the hinge pin in a direction substantially parallel to the display surface in the open position.

40. The display system as recited in claim 39, wherein the first portion of the flexible display is fixed to the first main display support, whereas the second portion of the flexible display is slidably mounted on the second main display support, allowing at the location of the mounting during movement of the display between the storage and open position a sliding movement of the second portion of the flexible display with respect to the second main display support in a direction substantially perpendicular to the direction of the hinge axis, the spring force biased mechanism comprising spring means located in the coupling between the second portion of the flexible display and the second main display support, biasing said segment of the flexible display in the respective position.

41. The display system as recited in claim 40, wherein the spring means comprise at least one spring biasing in the respective position of the display the slider element away from the hinge axis.

42. The display system as recited in claim 39, wherein each of said portions is slidably mounted on the respective main display support, allowing at the location of each mounting during movement of the display between the storage and open position a sliding movement of the respective portion of the flexible display with respect to the main display support in a direction substantially perpendicular to the direction of the hinge axis, the spring force biased mechanism comprising spring means located in each coupling between the respective portion of the flexible display and the main display support, biasing said segment of the flexible display in the respective position.

43. The display system as recited in claim 42, wherein the segment of the flexible display is fixed to the support frame substantially in the middle between the first and the second portion of the flexible display.

44. The display system as recited in claim 39, wherein movement of the display supports from the closed to planar configuration enables movement of the hinge pin to a spring force biased position.

45. The display system as recited in claim 39, wherein the system further comprises:
  a body, the first main display support being hingeably connected with the body, the two main display supports being hingeable between a wrapped configuration around the body for fixing the flexible display in a closed storage position and a planar configuration for fixing the flexible display in an open position, a third portion of the flexible display being coupled with the body, a second segment of the flexible display being located between the first and third portion of the flexible display,
  wherein the third portion of the flexible display is slidably mounted on the body, and
  wherein the display system comprises a spring force biased mechanism operative in either the open or closed position or both the open and closed positions of the flexible display, biasing said second segment of the flexible display in the open position.

46. The display system as recited in claim 39, wherein the spring force biased mechanism enables that the segment of the flexible display in the closed position is positioned with its curved end part at a distance from the hinge mechanism.

47. The display system as recited in claim 39, wherein the spring force biased mechanism enables that the segment of the flexible display in the open position is stretched, keeping the display taut in the area of the hinge mechanism.

48. A display system comprising:
  a continuous flexible display;
  a support frame comprising first and second main display supports, coupled by a hinge mechanism with at least one hinge axis and each structurally configured to support respectively a first and a second portion of the flexible display, the two main display supports being hingeable between a configuration for fixing the flexible display in a closed storage position and a planar configuration for fixing the flexible display in an open position, a segment of the flexible display being located between the said respective portions of the flexible display in the open position; and a spring force biased mechanism operative in either the open or closed position or both the open and closed positions of the flexible display, biasing said segment of the flexible display in the respective position, a body, the first main display support being hingeably connected with the body, the two main display supports being hingeable between a wrapped configuration around the body for fixing the flexible display in a closed storage position and a planar configuration for fixing the flexible display in an open position, a third portion of the flexible display being coupled with the body, a second segment of the flexible display being located between the first and third portion of the flexible display, wherein the third portion of the flexible display is slidably mounted on the body, and wherein the display system comprises a spring force biased mechanism operative in either the open or closed position or both the open and closed positions of the flexible display, biasing said second segment of the flexible display in the open position.

49. The display system as recited in claim 48, wherein the first portion of the flexible display is fixed to the first main display support, whereas the second portion of the flexible display is slidably mounted on the second main display support, allowing at the location of the mounting during movement of the display between the storage and open position a sliding movement of the second portion of the flexible display with respect to the second main display support in a direction substantially perpendicular to the direction of the hinge axis, the spring force biased mechanism comprising spring means located in the coupling between the second portion of the flexible display and the second main display support, biasing said segment of the flexible display in the respective position.

50. The display system as recited in claim 49, wherein the spring means comprise at least one spring biasing in the respective position of the display the slider element away from the hinge axis.

51. The display system as recited in claim 48, wherein each of said portions is slidably mounted on the respective main display support, allowing at the location of each mounting during movement of the display between the storage and open position a sliding movement of the respective portion of the flexible display with respect to the main display support in a direction substantially perpendicular to the direction of the hinge axis, the spring force biased mechanism comprising spring means located in each coupling between the respective portion of the flexible display and the main display support, biasing said segment of the flexible display in the respective position.

52. The display system as recited in claim 51, wherein the segment of the flexible display is fixed to the support frame substantially in the middle between the first and the second portion of the flexible display.

53. The display system as recited in claim 48, wherein the spring force biased mechanism enables that the segment of the flexible display in the closed position is positioned with its curved end part at a distance from the hinge mechanism.

54. The display system as recited in claim 48, wherein the spring force biased mechanism enables that the segment of the flexible display in the open position is stretched, keeping the display taut in the area of the hinge mechanism.

55. A display system comprising:
a continuous flexible display;
a support frame comprising first and second main display supports, coupled by a hinge mechanism with at least one hinge axis and each structurally configured to support respectively a first and a second portion of the flexible display, the two main display supports being hingeable between a configuration for fixing the flexible display in a closed storage position and a planar configuration for fixing the flexible display in an open position, a segment of the flexible display being located between the said respective portions of the flexible display in the open position; and a spring force biased mechanism operative in either the open or closed position or both the open and closed positions of the flexible display, biasing said segment of the flexible display in the respective position, wherein the spring force biased mechanism enables that the segment of the flexible display in the open position is stretched, keeping the display taut in the area of the hinge mechanism.

56. The display system as recited in claim 55, wherein the first portion of the flexible display is fixed to the first main display support, whereas the second portion of the flexible display is slidably mounted on the second main display support, allowing at the location of the mounting during movement of the display between the storage and open position a sliding movement of the second portion of the flexible display with respect to the second main display support in a direction substantially perpendicular to the direction of the hinge axis, the spring force biased mechanism comprising spring means located in the coupling between the second portion of the flexible display and the second main display support, biasing said segment of the flexible display in the respective position.

57. The display system as recited in claim 56, wherein the spring means comprise at least one spring biasing in the respective position of the display the slider element away from the hinge axis.

58. The display system as recited in claim 55, wherein each of said portions is slidably mounted on the respective main display support, allowing at the location of each mounting during movement of the display between the storage and open position a sliding movement of the respective portion of the flexible display with respect to the main display support in a direction substantially perpendicular to the direction of the hinge axis, the spring force biased mechanism comprising spring means located in each coupling between the respective portion of the flexible display and the main display support, biasing said segment of the flexible display in the respective position.

59. The display system as recited in claim 58, wherein the segment of the flexible display is fixed to the support frame substantially in the middle between the first and the second portion of the flexible display.

* * * * *